United States Patent [19]

Morse, III et al.

[11] Patent Number: 6,120,297

[45] Date of Patent: Sep. 19, 2000

[54] VOCABULARY ACQUISTION USING STRUCTURED INDUCTIVE REASONING

[75] Inventors: H. Ogden Morse, III, South Portland, Me.; H. Ogden Morse, Jr., Redding, Conn.; Peter S. Chislett, New York, N.Y.

[73] Assignee: Lyceum Communication, Inc., Redding, Conn.

[21] Appl. No.: 09/139,964

[22] Filed: Aug. 25, 1998

Related U.S. Application Data

[60] Provisional application No. 60/056,788, Aug. 25, 1997.

[51] Int. Cl.$^7$ .................................................. G09B 5/00
[52] U.S. Cl. ........................ 434/169; 434/167; 434/176; 434/156
[58] Field of Search .................................... 434/169, 167, 434/176, 156; 704/4, 3

[56] References Cited

U.S. PATENT DOCUMENTS 5,256,067  10/1993  Gildea et al. ..................... 434/169 X

*Primary Examiner*—Valencia Martin-Wallace
*Assistant Examiner*—Chanda Harris
*Attorney, Agent, or Firm*—Brown Raysman Millstein Felder & Steiner LLP

[57] ABSTRACT

A system for increasing the vocabulary of a student using inductive reasoning is disclosed. The system displays a target word to be learned and associated derivation information, followed by a clue. The derivation information can include a pronunciation guide, historical or anecdotal background information, information about its root and prefix or its foreign derivation. The derivation does not rely on a formal definition of the target word and usually does not include such a definition. Clues then request a response from the student. The correct responses require an understanding of the derivation of the respective word. The correct answer to the clue and an explanation for that answer are then provided, thereby adding to the information the student has about the target word's meaning. Typically, the first clue or first several clues will not include the target word in the question, or the expected answer to the question. Each clue and answer provides additional understanding of the target word and the student arrives at an individualized meaning for the word through inductive reasoning developed through responding to the clues.

32 Claims, 14 Drawing Sheets

Double Click to Start Game

| Category | Level | Words Completed | Words In Series |
|---|---|---|---|
| Roots & Prefixes | Level 1 | 0 | 20 |
| Roots & Prefixes | Level 2 | 0 | 20 |
| Roots & Prefixes | Level 3 | 0 | 20 |
| Mythical Words | Level 1 | 0 | 20 |
| Mythical Words | Level 2 | 0 | 20 |
| Mythical Words | Level 3 | 0 | 20 |
| Strange Words | Level 1 | 0 | 20 |
| Strange Words | Level 2 | 0 | 20 |
| Strange Words | Level 3 | 0 | 20 |

FIG. 5

Roots & Prefixes transgress tranz'-gress verb

DERIVATION

Transgress comes from the Latin prefix *trans* (across) and the root *gradi*, meaning to step, walk. This root appears as either *gress* or *grade* in English. For instance, your grade in school is equivalent to a step along the road of education. And since steps can go in any direction, there are many different prefixes used with this root. But the meaning of these words is not always literal, as you will see.

CLUE 3

Read the following sentence:

In an effort not to transgress the speed limit, I took my foot off the accelerator.

In this sentence, transgress most nearly means:

- eliminate
- obliterate
- exceed
- establish
- proceed

FIG. 7

Roots & Prefixes

BONUS WORD 2

Based on your knowledge of this word, do you have enough clues to uncover the meanings of the following related words?

transgress
tranz'-gress
verb
DERIVATION

Transgress comes from the Latin prefix *trans* (across) and the root *gradi*, meaning to step, walk. This root appears as either *gress* or *grade* in English. For instance, your grade in school is equivalent to a step along the road of education. And since steps can go in any direction, there are many different prefixes used with this root. But the meaning of these words is not always literal, as you will see.

aggressive

YOUR ANSWER WAS: FAST

TRY AGAIN

NEXT

FIG. 10A

Roots & Prefixes: Level 3

○ all words
◉ problem words transgress
exhort transgress
*Your Score: 3 Your Rating: 30*

Transgress comes from the Latin prefix *trans* (across) and the root *gradi*, meaning to step, walk. This root appears as either *gress* or *grade* in English. For instance, your grade in school is equivalent to a step along the road of education. And since steps can go in any direction, there are many different prefixes used with this root. But the meaning of these words is not always literal, as you will see.
Clue#1
*Which of the following actions would result in stepping forward?*
progress
Clue#2
*In the movies, the bad guy is told by a law officer that if he steps across the line, what will happen to him?*
arrest
Clue#3
*Read the following sentence:*
In an effort not to transgress the speed limit, I took my foot off the accelerator.
In this sentence, transgress most nearly means:
exceed
Clue#4

Quit Review

FIG. 13

VOCABULARY ACQUISTION USING STRUCTURED INDUCTIVE REASONING

This application claims benefit of Provisional Application Ser. No. 60/056,788 filed Aug. 25, 1997.

BACKGROUND OF THE INVENTION

1. Field of the Invention

The invention pertains to methods and apparatus for training students using inductive reasoning tasks. More particularly the invention is directed to teaching vocabulary using inductive reasoning.

2. Discussion of Related Art

In most schools, a vocabulary development program of some kind is a part of the students' formal education at all levels, because of the importance of vocabulary to academic success in either the sciences or in the arts. Conventional methods of learning vocabulary rely on memorization of a word and its meaning and test a student's ability to recall the word's meaning by prompting the student to answer a direct question, although such drills generally do not result in a high level of retention for the student.

Generally, the conventional vocabulary development programs have included some or all of the following instructional tools:

- reading lists selected from a wide assortment of authors and writing styles
- a list of words selected by the teacher from these texts
- lists of unfamiliar words compiled by students while reading these texts
- workbooks providing exercises that help students memorize word meanings The use of workbooks is currently the most common practice in the schools. All these tools, however, either give students a formal definition of a target word, such as is found in a dictionary entry, or have students locate the dictionary definition of the target word themselves. Then the student is expected to memorize this definition and use the target word correctly in the context of a sentence of their own devising, or in some other exercise. This is the standard procedure, and it has been used for many years despite recent educational research indicating that memorization typically results in very limited retention of new vocabulary words and does little to improve a student's active, working vocabulary.

Moreover, when students use a dictionary to find the meaning of an unknown word, they often select a definition that they do not fully understand, or they choose a synonym that is inappropriate for the context in which the target word appeared. This latter case is especially true for words that have multiple meanings, and words that may be used in more than one part of a sentence, such as words that are both nouns and verbs, or both nouns and adjectives.

Current research strongly suggests that, generally, when learning virtually any subject matter, students learn best when they approach problems inductively, rather than by finding answers in memorized material, because doing so requires the use of the higher-order reasoning skills, analytical and synthetic reasoning. Particularly when it comes to vocabulary development, students' retention of words and the depth of their understanding of the words' meaning increases significantly once they achieve their own, personalized set of associations with a new word and its relationship to a variety of contexts.

However, when students are accustomed to memorizing word definitions they find in a dictionary, even though the result is definitions they do not fully understand, or synonyms that are inappropriate, it is a familiar routine which provides the student a sense of certainty, even though often a false certainty. Inductive reasoning, in contrast, involves a degree of experimentation and creative risk taking that students associate with video adventure games, but not with school. Interactive computer technology, however, has increased students' willingness to edit and revise their school work, producing a greater latitude and greater enthusiasm in their efforts at experimentation in the classroom because:

- revision is immediate and relatively painless since the students do not themselves have to re-type subsequent text affected by the change;
- automated revision and comparison of multiple attempts is possible; and
- automated aids such as spell-check and thesaurus, grammar, syntax and format checks and suggestions are available Students are more likely to investigate different approaches when they know that such assistance is available even when teachers aren't present, in turn giving teachers freedom to provide individualized attention for students who need help of a more personal and direct nature. Nonetheless, students who are academically highly motivated often hesitate when confronted with inductive reasoning tasks, reluctant to venture beyond the security of rote exercises and dictionary definitions.

SUMMARY OF THE INVENTION

Given the problems encountered in teaching students the vocabulary they need to learn, a structured learning system that supports students' confidence in their own ability to extrapolate, distinguish, reason by analogy, etc., as is necessary in producing a creative, personalized understanding of selected vocabulary terms, is provided in accordance with the present invention. The conciseness and predictability of this structured approach to teaching students using inductive-reasoning tasks has proven particularly helpful to those reluctant students who prefer the security of rote exercises and dictionary definitions. Thus, simultaneously, the word or concept so efficiently learned in accordance with the present invention, is the means to another end beyond itself, because of the types of learning skills used in accordance with the present invention. By using the higher intellectual functions required by analytical and synthetic reasoning to derive a personal individual meaning of a word and relating that individual meaning to the actual meaning implicit in the exercise, a student learns vocabulary words in an effective manner without resorting to rote memorization and quizzes.

The automated, highly-patterned steps of this otherwise creatively wide-ranging inductive process foster students' confidence in using analytical and synthetic reasoning to process the statements made by others and their own independent observations, as well as acquiring vocabulary needed for academic success. Thus, the intellectual exercise provided in accordance with the present invention strengthens analytical and synthetic reasoning skills that are the cornerstones of critical thinking. Nurturing such skills, for their own sake, is one of the primary goals of modern educational theory.

In accordance with the present invention, the acquisition of each new addition to the student's vocabulary begins with a display of information indicating the derivation of the target word. In particular embodiments this derivation display may include information such as literary, historical or anecdotal references to the target word, an explanation of its foreign language derivation, or a description of the component parts of the word, such as its root, prefix, etc. Preferably the definition of the target word is not part of the derivation display.

In a particular embodiment, the derivation display includes a description of an historical incident, or an anecdote, which establishes a context for the student's investigation of materials related to meaning of the target word. For example, the WATS tutorial system uses "Words And Their Stories" to teach vocabulary by associating new vocabulary words, the "target" words, with such stories. In our many years of experience as professional educators, and in classroom teaching, in particular, we have observed that associating memorable, enjoyable stories with elements being learned makes the process both more enjoyable and more successful for the student.

After seeing a derivation display for a target word, the student advances to another display for that target word. This subsequent display provides a "clue" whereby the student is given an opportunity to respond by making a selection among a given number of answers available on the display. After seeing the correct answer for a clue, the student advances to the next clue. When the answers to all clues have been revealed, the student is shown a formal definition of the target word that is implied by the information selected for the derivation and clue displays. The student can then compare the formal definition implicit in the displays to the student's own individualized understanding of what these derivation and clue displays were using as the definition of the target word. This comparison reinforces the newly-acquired addition to the student's vocabulary.

Preferably the student is also given the opportunity to review the previous clues to that implicit definition of the target word and the correct answers to the clues. This review provides the student feed back concerning the student's use of inductive reasoning in determining the target word's meaning, as well as reinforcing the student's understanding of the meaning of this newly-acquired addition to the student's vocabulary.

Preferably, this process for acquiring a new addition to the student's vocabulary is implemented using interactive computer technology, so that a further display is automatically presented in response to the student's selection of an answer in response to the clue. This further display shows either instructions indicating that the student should make another selection, or the correct answer and an explanation of the correct answer for that clue.

In a particular embodiment, a bonus word or words and bonus clues related to the target word or some aspect of its meaning are provided after the correct answer to the last clue is displayed. Preferably, the student also receives credits for correctly responding to the clues, thereby providing an incentive to the student to sharpen higher reasoning skills so that correct answers are selected sooner, earning more point credits.

In particular embodiments, the response required from the student by a clue may be the answer for a multiple-choice question, a fill-in-the-blank sentence-completion task or even an analogy-selection exercise, such as those used in standardized tests. However, each "clue" provides a clue to the meaning of a respective target word.

In particular embodiments, selecting the correct answer for a "clue" requires the student to draw upon information provided in the derivation display or in a preceding clue, or upon the student's general knowledge to arrive at the answer. Preferably each successive clue for a particular target word provides less supportive information, thereby requiring progressively greater reliance upon the student's own understanding of the derivation and previous clues provided for the target word.

Preferably a predetermined number of clues is provided for every target word selected for presentation to students having similar levels of learning assets such as self-confidence, attention span, short-term memory, etc. Preferably, each clue provided for every target word selected for presentation to students having similar levels of learning assets such as self-confidence, attention span, short-term memory, etc.also provides the same number of response options to the student.

In a particular preferred embodiment, five clues representing five different types of clues are provided for the student to use. Preferably, these clues are provided in an order found to be particularly effective for leading students to an individualized definition of the word rather than merely recalling a dictionary definition, wherein the first two clues do not use the target word in either the clue or the answers provided for the student's selection, but the last two clues do use the target word. Thus, in a particular embodiment, the first clue is directly related to derivation, the second clue requires the student to combine items of general information, things that are common knowledge with information in the derivation, the third is a sentence containing the target word and asking for a synonym for the target word, the fourth clue is an analogy using he target word, and the fifth clue, an incomplete sentence containing the target word In a particular embodiment, the interactive technology maximizes the impact of the learning process provided in accordance with the present invention by implementing the derivation and clue display as part of an attractive, fun-to-use interface. Preferably this interface provides a scale of point credits for successfully selecting answers for the clues, so that more credit is given when the student's first answer is correct. Also, preferably, the interface keeps a record of the number of words studied, the number of correct or incorrect answers given to clues, and the total score for each individual student, thus providing both students and teachers with an ongoing assessment of each student's progress.

In accordance with the invention, students are trained to use new terminology by using inductive reasoning to relate a target word to a derivation-information display and a clue display. Responses by the student to a set of clues related to the target word are monitored and explanations of the correct answers to the clues are provided. Preferably the student is given several opportunities to select the correct answer for each clue, if necessary. The derivation information and the clues, because they do not define the target word, lead the student to from an individualized working hypothesis of what that definition might be.

In a particular embodiment, after a correct response to a clue and after more than one incorrect response, a correct answer is provided, along with an explanation of the correct answer that further adds to the student's understanding of the target word or its derivation. Preferably, an attractive user interface also tracks the student's progress in learning new vocabulary words by providing a performance rating, without "grading" the performance in terms of success or failure.

BRIEF DESCRIPTION OF THE DRAWINGS

The features and advantages of the present invention will be better understood when the detailed description of preferred embodiments, given below, is considered in conjunction with the figures provided, wherein:

FIGS. 4 through 13 are screen displays of a computer programmed with software providing a vocabulary learning system in accordance with a preferred embodiment.

DETAILED DESCRIPTION OF THE INVENTION

Figure 1:
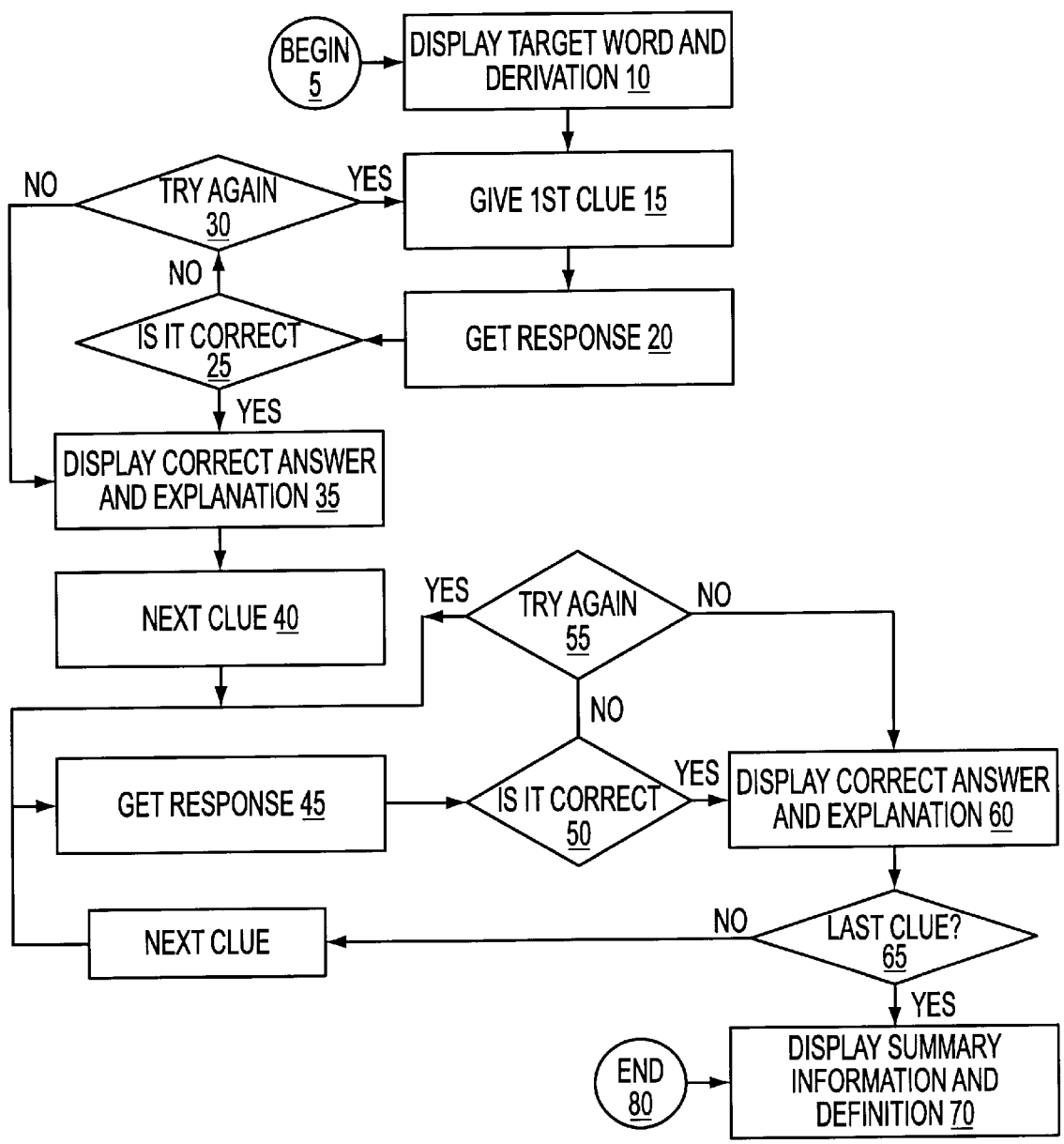
FIG. 1 is a schematic flowchart of the basic vocabulary learning sequence for using inductive reasoning in accordance with a first preferred embodiment of the present invention.
Figure 2:
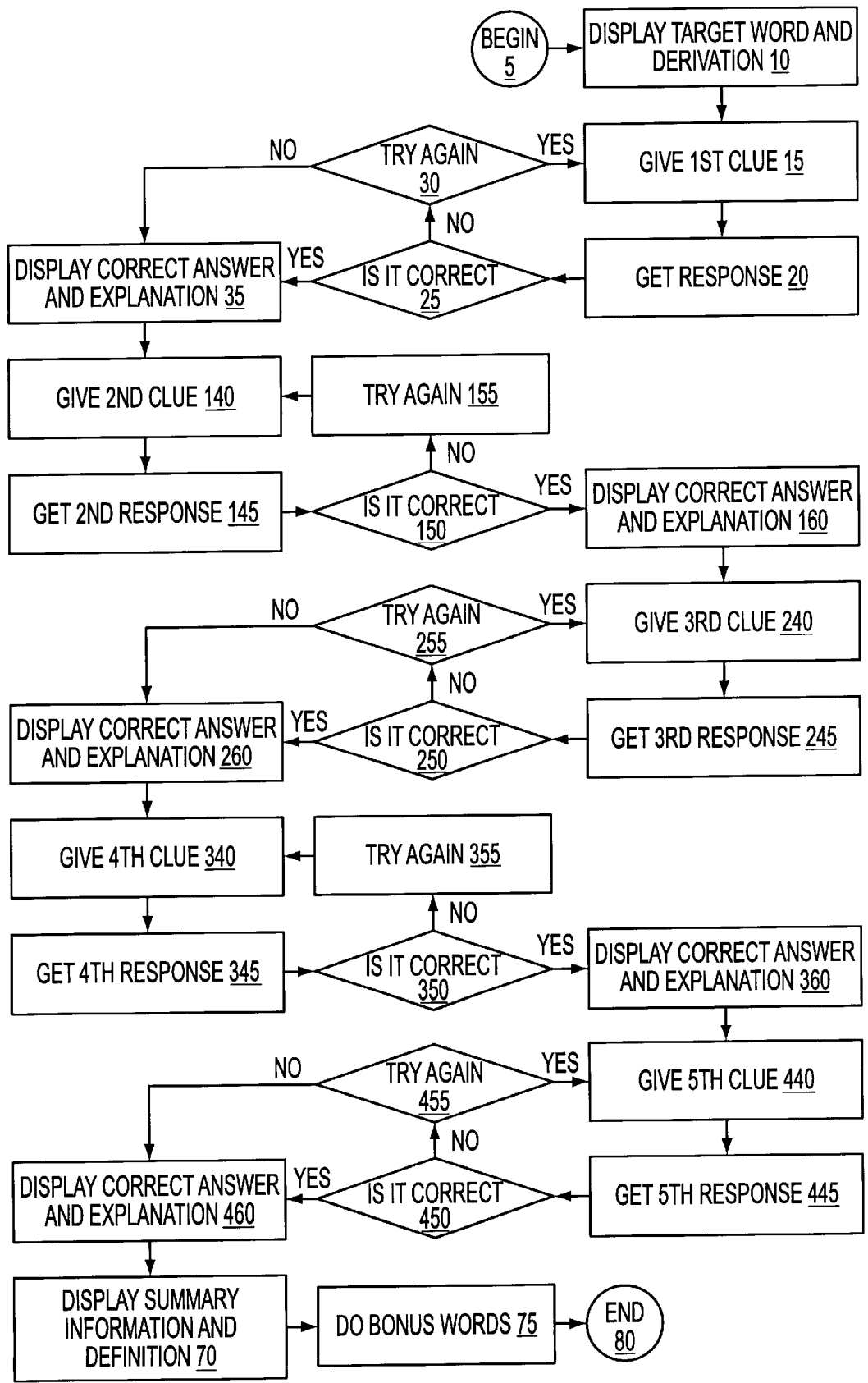
FIG. 2 is a flowchart schematically showing the logic of the program in a preferred embodiment of the present invention.

FIGS. 1 and 2 show a stand-alone tutorial process for increasing a student's vocabulary using inductive reasoning that is implemented by a software program on a computer having a processor and a display. In a preferred embodiment the software program displays a welcome screen when the student begins working on the computer, such as that shown in FIG. 4. The student advances to the next screen to select a category and level, as those shown in FIG. 4. The system then displays a target word and derivation 10 suitable for the category and level selected by the student. The system tracks the performance of individual students and, thus, when a student logs on it identifies that student and sets parameters of the system in accordance with a data file for that identified student that is stored by the computer.

Figure 6:

The display of the target word and derivation 10 will typically include the word and its phonetic spellings and some of the background information about the word, as shown in FIG. 6. Preferably, the formal "dictionary" definition of the word is not included in this information. The information provided will typically include historical or anecdotal references to the word, explanation of its component parts such as the root of the word and its prefix, or its foreign language sources. It may also include a story about the word, or compare the word to other words often confused with it.

Exhibit A presents five examples of the inductive exploration of target words in accordance with the present invention. Here the target words are: sophisticated, assign, axis, desultory, and credulous. Exhibit B applies inductive learning in accordance with the present invention to the phenomena of physical chemistry, using the target word "sublimation".

The system first gives the derivation information 10, and then gives a first clue 15 to which the student enters a response 20. In order to have the student arrive at a meaning of the word inductively providing a correct response, the clues provided to the meaning of the word are presented in such a way that will require analytical reasoning and an understanding of the information given in the derivation of the target word. Preferably, the first clue will neither include the target word in its prompt, nor require it in the response.

The processor analyzes whether the student's response is correct 25. If the response is not correct, the processor may allow the student to try again 30 by giving the first clue 15 over again and, preferably, dimming out or hiding the incorrect response. The screen displays the expected response to the clue along with an explanation 35 of why that expected response is correct, when the student's response is correct, or after a predetermined number of incorrect responses to the clue, typically two. This explanation of the required answer provides additional information to the student, beyond what is provided by the derivation, thus contributing to the student's resources for use in eventually determining the target word's meaning After displaying the explanation, the screen then displays additional clues 40. The processor obtains the student's response 45, tests whether the response is correct 50, and either allows the student to try again 55 by repeating the additional clue 40 or displays the correct answer on the screen with an explanation 60, if the student gave the correct response to the one additional clue that was offered or after a certain number of incorrect responses typically two, as before.

FIG. 2 shows a second embodiment that provides four additional clues (second through fifth clue) to the student and also Bonus Words. In FIG. 2, after the system displays the correct answer and explanation 35 to the first clue, the system gives a second clue 140 and it gets the student second response 145. The system tests whether this response is correct 150 and allows the student to try again 155 if it is not. If the answer is correct, the system displays the correct answer along with an explanation 160 and gives the third clue 240. The student gives a third response 245 and the system tests to see if it is correct 250. If it is not, the system allows the student to try again 255, and if it is correct the system displays the correct answer along with an explanation 260 and gives the fourth clue 340. The system gets a fourth response 345 and tests if it is correct 350, prompting the student to try again 355 if it is not, and displaying the correct answer and an explanation 360 if it is. Then the system gives the fifth clue 440 and gets the fifth response 445. The system tests if it is correct 450 and allows the student to try again 455 if it is not. If the response is correct, the system displays the correct answer and explanation 460.

Preferably, in the embodiment shown in FIG. 2 the five clues are presented to the student in a very specific order, and each clue is designed to provide a particular type of addition to the student's understanding of the target word. The first two clues do not use the target word in either the prompts or the answer choices, but the last two clues do use it. For example, the fourth clue can be an analogy that does use the target word and the fifth clue, an incomplete sentence containing the target word.

The correct answers and explanations 60 are displayed. Additional clues, for the processor checks whether any more clues are available 65. If there are more clues, the system gives an additional clue 40, displays the correct answer and explanation 60 and again tests whether any more clues are available.

After the display of the correct answer and explanation for the fifth clue 460 in FIG. 2, or the last clue 65 in FIG. 1, a summary of the student's progress and performance in learning the target word are displayed. The formal dictionary definition is also given at this stage, so that the student can compare that definition to his or her own individualized meaning which has been obtained inductively through responding to the prompts and understanding the explanations for the answers. In other words, the prompt and answer with explanation, or the "clues," provide clues to the target word's meaning.

Bonus words 75 may also be provided as shown in FIG. 2. The bonus words further students' understanding of the target word by giving new, closely related words and prompting the students for a response that indicates their understanding of the related words. The display also shows students the correct meanings of the related words along an explanation of how they are related to the target word, as is done for clues.

When the bonus word exercise is completed, the target word's definition and the students performance rating/index for the target word is displayed. All of the student's progress and performance data that has been tracked for this target word is logged in an assessment file. The student can then either resign from the tutorial session or continue. To continue, a new target word is presented within the same category and at the same level. When all the target words have been used, that is no words available, that haven't been studied yet according to the assessment data file for this student, a new screen for selecting a new level and category for this target is displayed. Once the new level and category are selected, the process begins again.

Preferably a score card describing the student's performance for the current category and level are displayed including the maximum possible scores, total credits the student earned, and the student's rating. Alternatively, other assessment schemes may be used, varying the number of credits each clue and bonus word is worth; keeping track of how much time responses take compared to particular benchmarks, etc.

Unlike the total credits earned that is reported along with the maximum possible score for each target word in the embodiment described below, the performance rating is a ratio of the sum of the points credited for the clues and bonus items presented for a given target word, divided by the total number of points possible for the clues given for that target word. Thus, this is a performance index that is independent of any variation in the number of clue points available for different target words. This is particularly advantageous because it permits the rate at which correct answers were selected for one target word to be usefully compared with the rates achieved for other target words.

In this way the automated user interface provides the student the information needed to determine, based on performance demonstrated in acquiring several target words, whether a another level of difficulty would be more appropriate. It also may be used to compare the relative efficiency of different reasoning strategies used for different target words Thus, with this flexible tracking, the tasks assigned for learning each of the target words are not tests of the student's reasoning skill, but an exercise that can be tailored to whatever level of difficulty and rate of progress is most satisfactory for the student.

Figure 3:
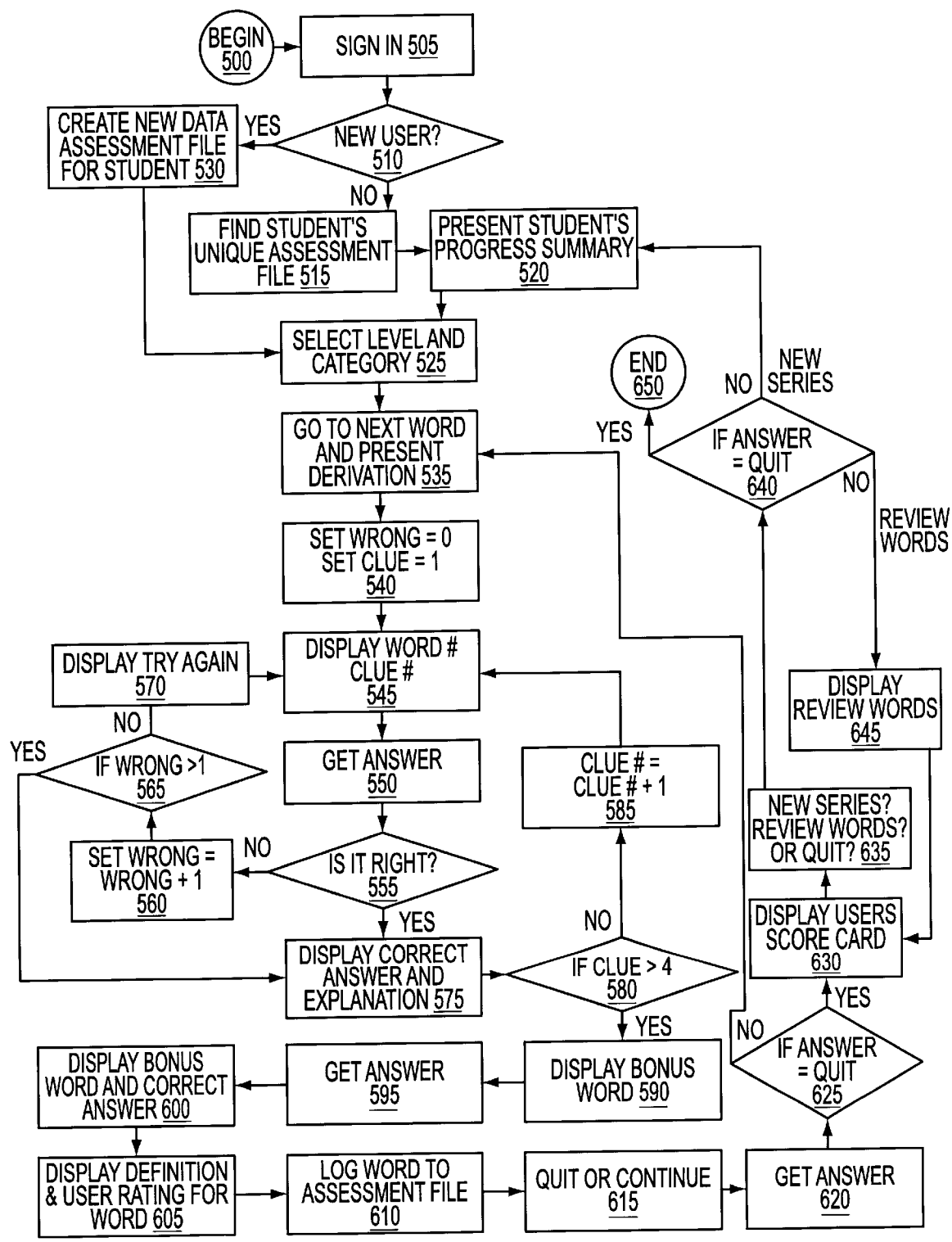
FIG. 3 is a flowchart schematically showing the logic of the program in a preferred embodiment of the instant invention having means for storing and retrieving identifying information about different students using the program, and means for tracking the correct and incorrect responses made by each student.

FIG. 3 shows the administrative control process supporting the tutorial processes shown in FIGS. 1 and 2, which is also implemented by a software program on the computer. The computer begins 500 by asking the student to sign in 505 and provide an identifier. The computer then checks if this is a new student 510. If it is not a new student, the computer finds the student's existing assessment file 515 and displays the current progress summary 520. Otherwise, the system creates a new assessment file for that student 530.

The assessment file is used to tally and track a particular student's performance. The data captured in this file may be displayed in many forms, as progress summaries as well as score cards. Progress summaries specify the number of words the student has studied at specific levels in each category, and the total number of words that are available in each level of each category. The inventors have found it very important and valuable to accumulate and present this additional, judgment-free overview information to students, to give them control of their rate of progress. Of course, teachers and others evaluating students' progress may also use the progress summaries and other data in the assessment files to monitor students' performance and their use of the program.

Having seen the progress summary, the student selectsa level and category 525 where new words are available. Levels may be designated as beginner/intermediate/advanced, by grade levels, or by any other sequential scheme for grouping of the target words within a category. The categories, on the other hand, divide the target words within a level based on their affinities. The categories may be based on the type of derivation used, for example.

Derivation information for the "derivation" display for a target word may include historical or anecdotal information, descriptions of the meanings of their roots and prefixes, the word's derivation from foreign language usage, and other categories discussed below. Alternative category structures may use the parts of speech as categories: verbs, nouns, adjectives, etc., or focus on a particular experiential context, such as words used in restaurants, words used in hotels, words used for travel activities. The latter type of category has been found to be particularly useful in using the present invention for teaching students the vocabulary of a foreign language.

The program begins a tutorial session by identifying one of the target words that is available at the selected level, and finding its derivation information 535. The control program also initializes a "number wrong" counter to zero and a "clue number" counter to one 540. The derivation of the current word (#1) and the current clue (#1) are then each displayed 545 as in FIG. 2. The computer obtains the student's response 550 to the first clue and tests the correctness of the student's response 555. If it is a right answer the computer displays that correct answer and its explanation 575. If the student's response was not the right answer, the program increments a "number wrong" counter by one 560. If the "number wrong" is still less than two 565 the computer prompts the student to try again 570 and displays the same word and clue 545. If this accumulated number of wrong answers is not less than two 565, or if the student's response was correct, the program displays the correct answer and its explanation 575 and tests to see if "clue number" is less than five 580. If the clue number is less than five 580, the "clue number" counter is incremented by one 585. The same word and the next new clue are then displayed 545 and the clue-response process is repeated.

The tutorial information for each target word is stored in a database. The information stored in the database for each target word includes: its category and difficulty level, and its phonetic spelling including alternative spellings; the part speech represented by the form of the target word that is used in the clues, i.e., a noun, verb etc.; the derivation information; the clues and their respective multiple choice answers; the correct answers and their explanations; the bonus words and their answers and, finally, the target word's formal definition.

Other information related to the target words may also be stored in this database. For example, hooks may be provided in the database to enable audio, display animation or video elements to accompany the displays provided for each target word. For certain target words, recorded or synthetic audio sequences may be used to illustrate the target word's pronunciation. Additionally, the text of each clue, the clue's multiple choice answers, and the explanations of target words' usage may also be provided as audio. For example, a voice may prompt a student that their time for responding has run out. Sound effects and visual effects may also be included, which enhances the program's interaction with the student.

After the correct answer and explanation 575 for the last clue (#5), is displayed 580, one or more bonus words are displayed 590, typically in the form of a question, and the student responds to each of the bonus word 595. The system then displays the respective bonus word and its correct answer 600. After all those bonus words and their correct answers have been displayed, the student advances the program to the display of operative definition of the target word, and the student's performance rating for that target word 605. The computer then logs the respective target word into the student's assessment file 610 as "completed" and offers the student a choice: quit or continue 615.

The student's choice is obtained 620 and tested 625 by the program. If the student does not quit, the program goes back and allows the student to select a level and category 525 for the next target word. Alternatively, the program may automatically increase the word number counter by one and reset the clue number to one, so that a new target word and its first clue 535 are displayed as the tutorial sequence continues.

If the student chose to "quit" 625, the program displays the student's scorecard 630 and offers the student a set of options 635: a) study new clues, b) review previous words or c) quit. The student's selection is then tested 640. If the student selected "quit" was selected, the tutorial session ends 650. If the student chose to review words previously displayed, the review words 645 are displayed and the student's scorecard 630 is displayed again when the student advances to the next display. If the program finds that the student has selected "new words" when the student's response is tested 640, the program redisplays the progress summary and waits for the student to choose a level and a category 525 for the new target word.

Figure 4:
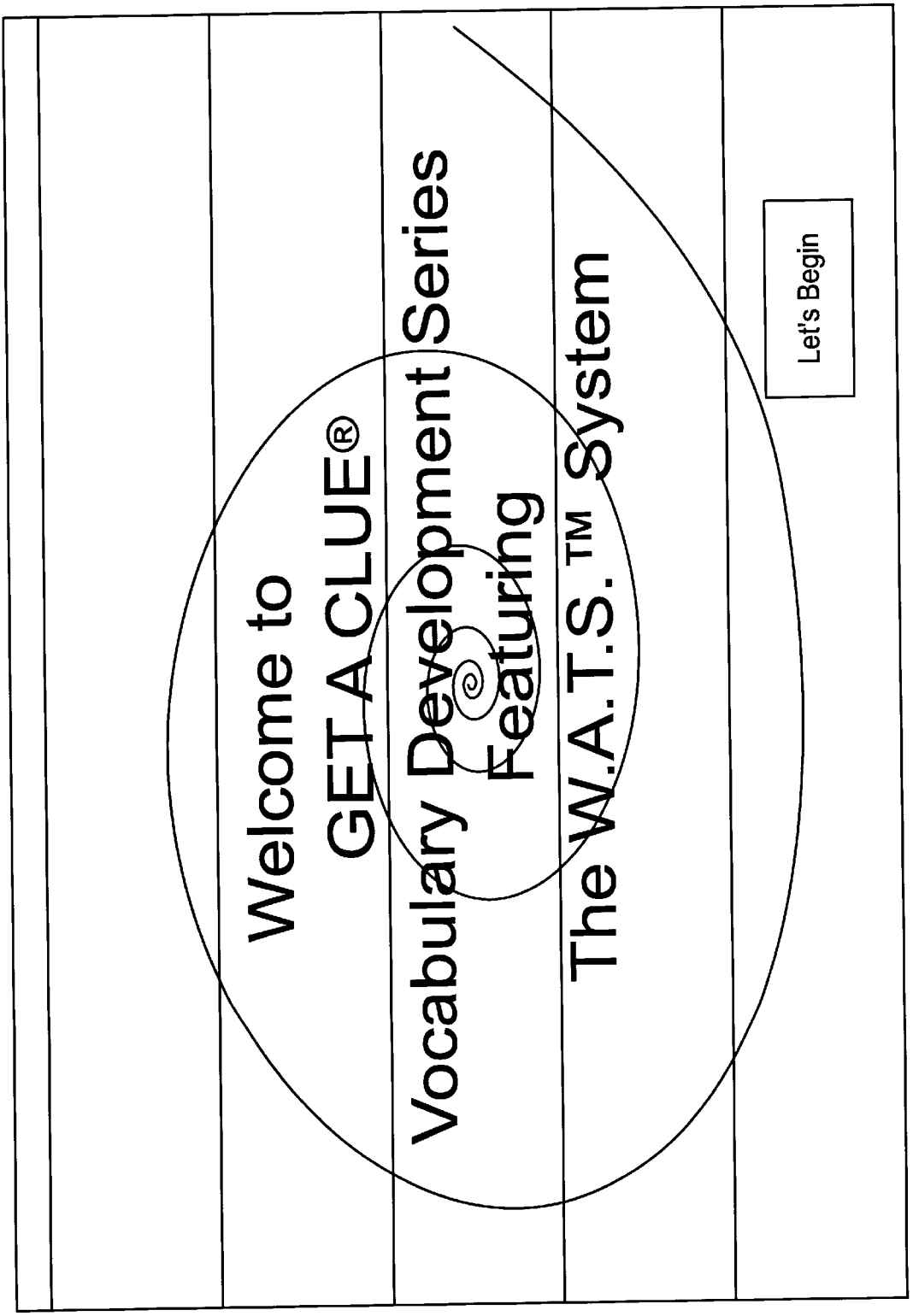

With reference to FIGS. 4–13, the welcome screen shown in FIG. 4 is displayed when the tutorial program on the computer is initialized. This screen may dissolve into the next screen, or may wait until student presses a button, such as the "Let's Begin" button shown in FIG. 4. On the next screen, the student chooses one of categories at one of the levels shown in FIG. 5 to advance the program. The first target word for the selected category and level, and its derivation are displayed on the screen shown in FIG. 6. This derivation screen requires the student to point and click on the "NEXT" key to advance the program so as to the screen showing the first clue. Each clue is displayed on the screen with a list of answers, as shown for clue #3 in FIG. 7. The target word, its pronunciation and its derivation are also all shown as a reminder to the student.

Figure 8:
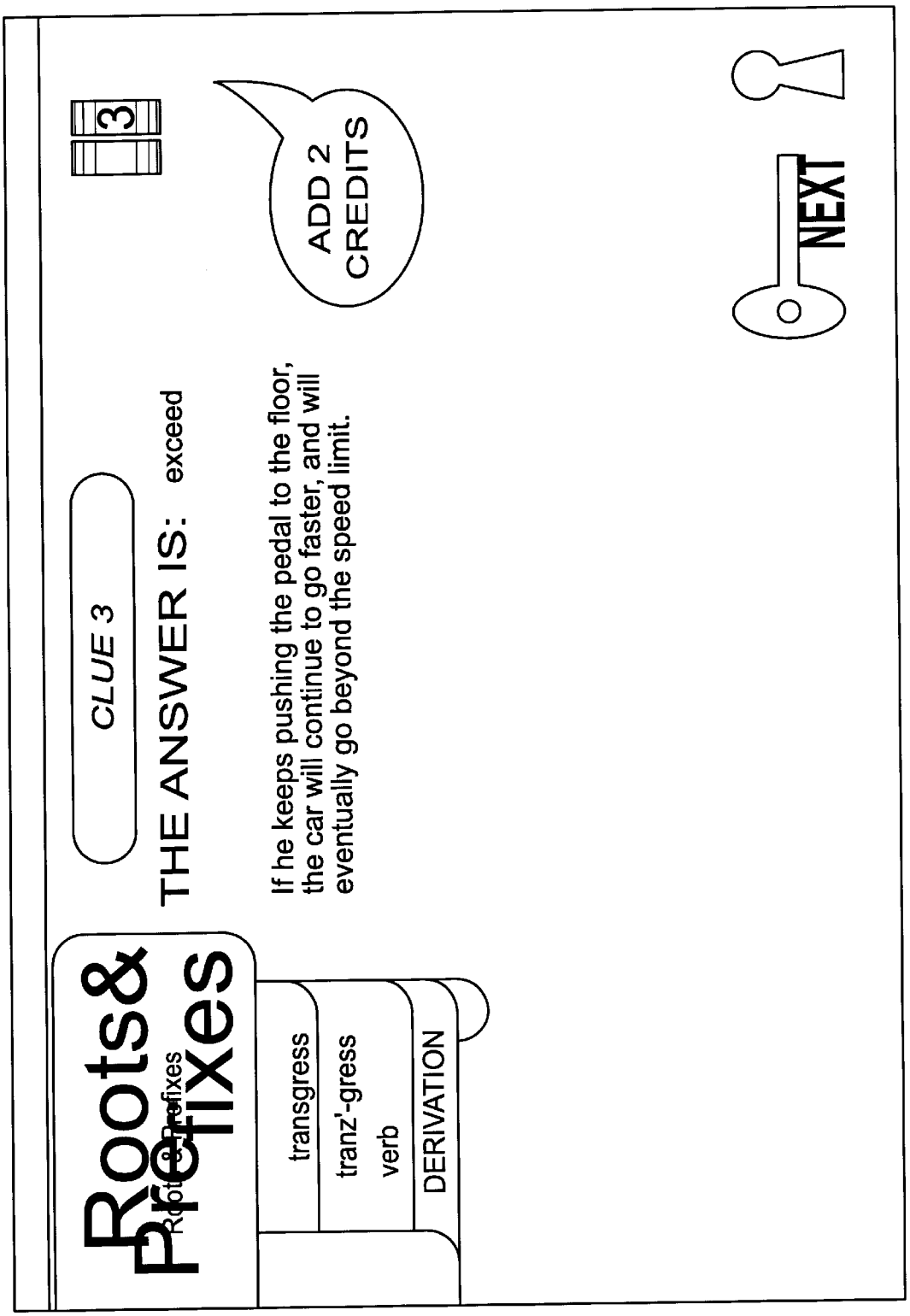

When the correct answer is selected for a clue, the next screen is automatically presented, showing that answer and giving a short explanation of that answer, as shown in FIG. 8. If this was the student's first attempt at answering the clue, two credits are added to the running total shown at the upper right of FIG. 8. However, if this is the second attempt, one credit is awarded, and if the student does not guess correctly after two attempts, the answer screen shown in FIG. 8 is displayed but no point credits are awarded.

Figure 9:
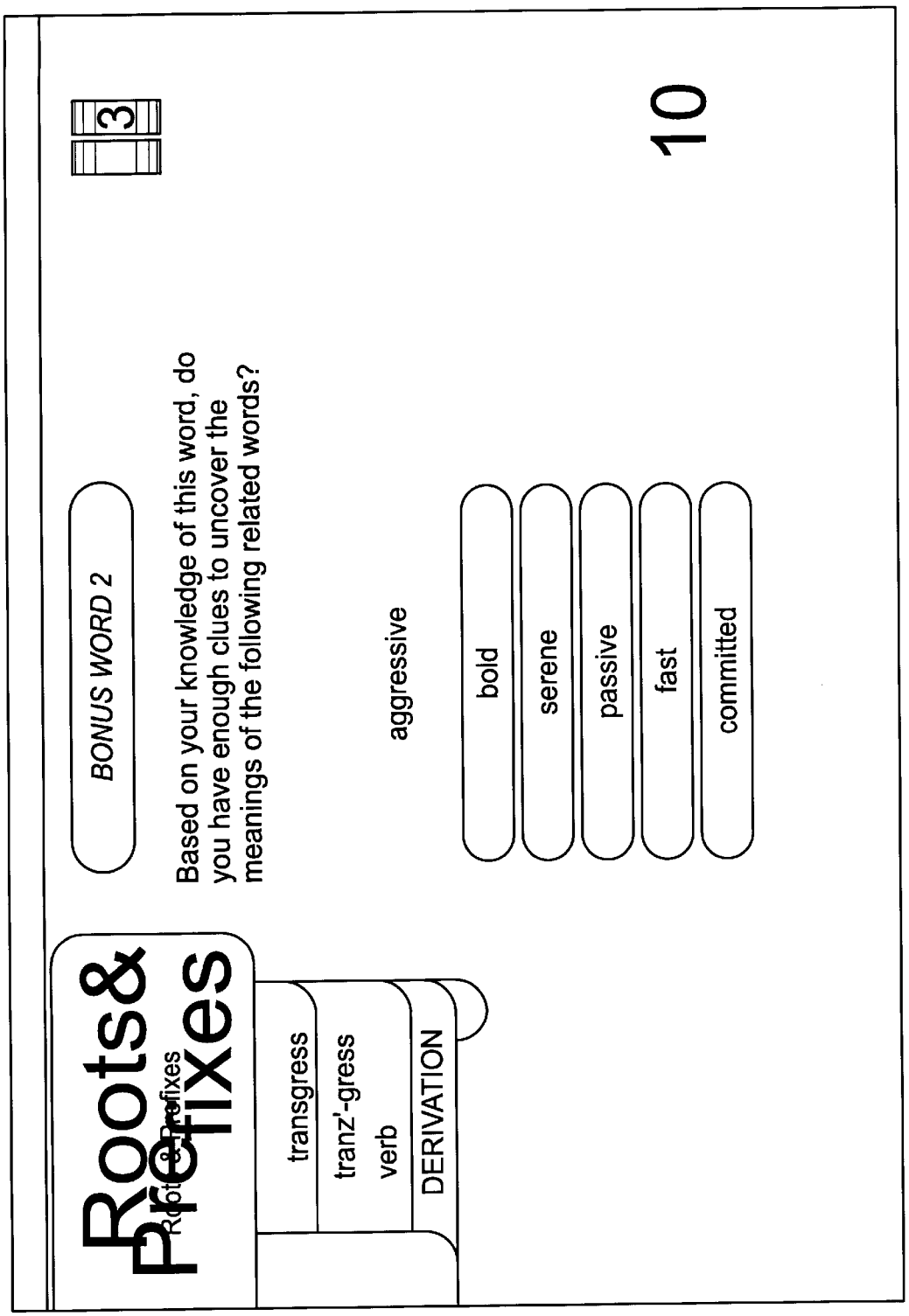
Figure 10B:
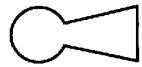

After all five of the clues provided in this embodiment have been explained, bonus words relating to the target word are given in a similar manner, as shown in FIG. 9. However, there is only a single opportunity to correct an incorrect response, such as the "Try Again" Answer screen shown in FIG. 10A. Also, as shown in both FIGS. 10A and 10B, although the correct answer is given, no explanation of the correct answer is given. Thus this serves as a confirmation of the preceding work on the target word, rather than a continuation of it.

Figure 11:
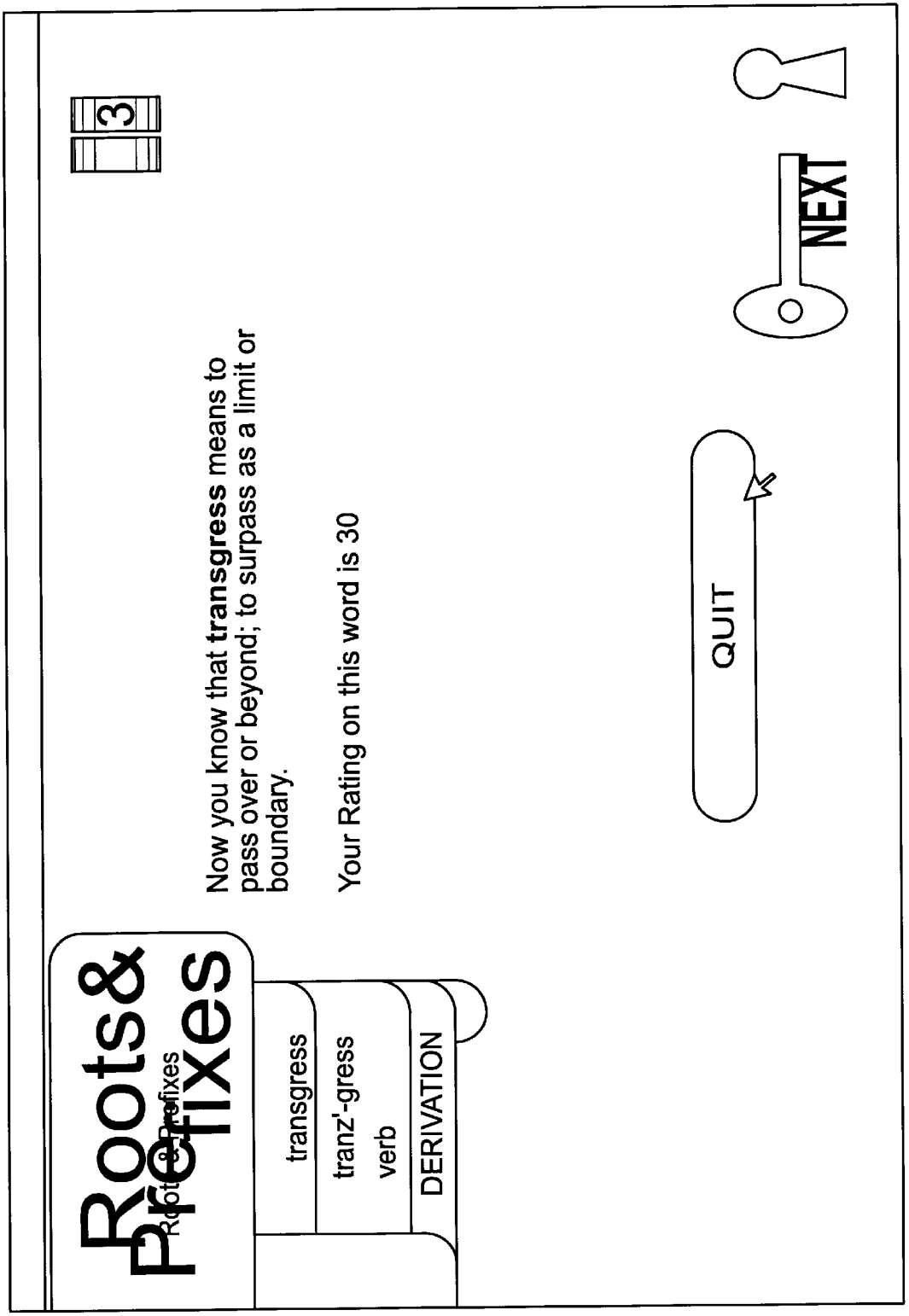
Figure 12:
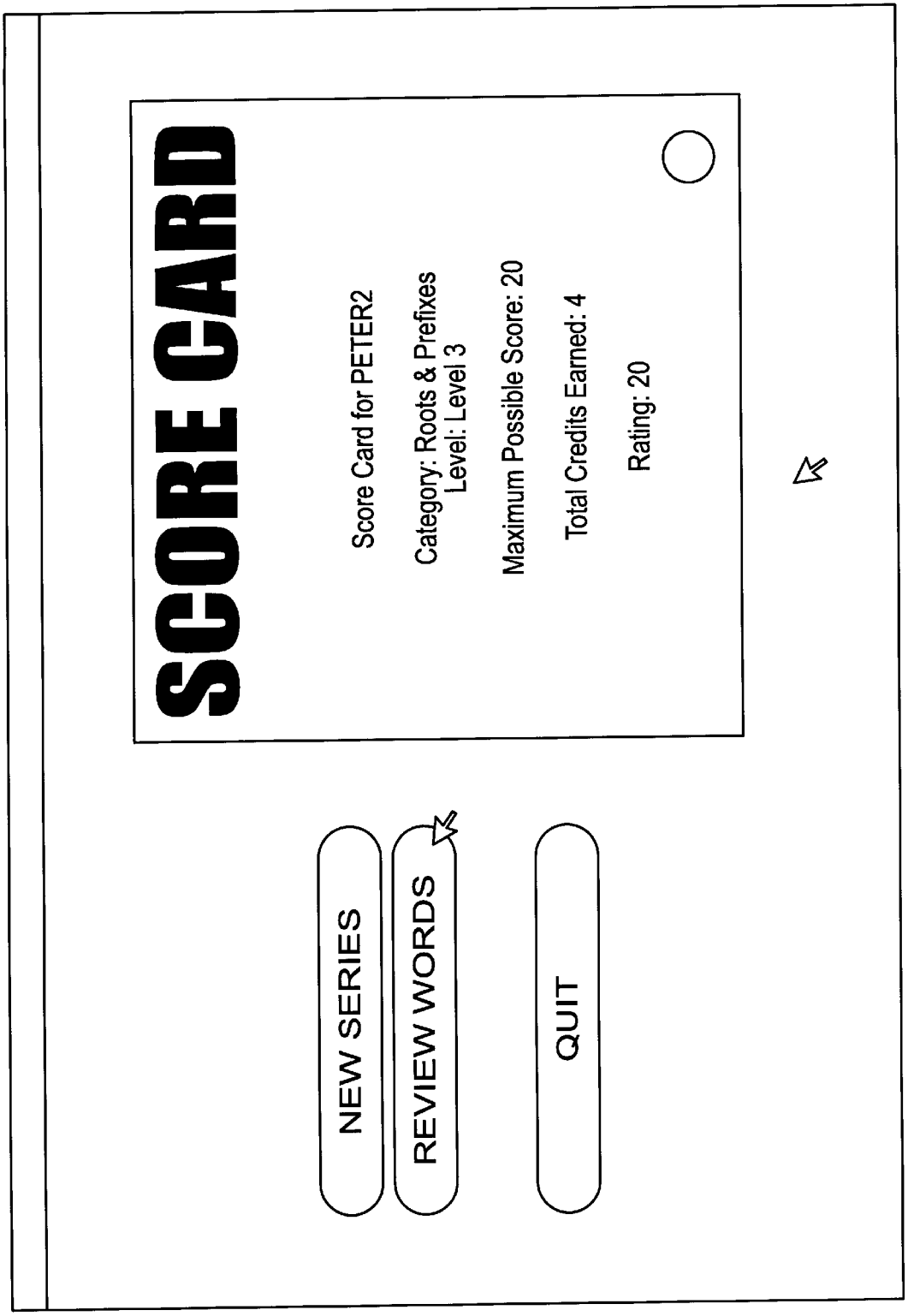

After the explanations for all clues and bonus words are displayed, the formal dictionary definition of the target word is given along with the rating index for the student's performance in the inductive tasks carried out in adding that word to the student's vocabulary, as seen in FIG. 11. A scorecard is then displayed with three choices: 1) a new series of words, 2) a review of the words completed, or 3) exit from the tutorial program.

If the student chooses to review the list of words completed thus far for any given category and level, the target word, its derivation, and all clues and explanations for any target word selected from that list of words are all shown on a single, scrollable screen, as in FIG. 13.

FIGS. 4–13 show the three key elements of our method. The display showing the derivation, and displays showing clues or bonus words guide the student, but the control and oversight tools provided by the GUI empower the student to control the learning process. These elements were excerpted from a tutorial sequence teaching the word "transgress" in accordance with the present invention. A complete strategic sequence of display screens provided by this particular graphical user interface (GUI) in accordance with the present invention uses these elements is as follows:

Each target word, is introduced on a screen that shows both one or more phonetic spellings indicating its pronunciation and an indication of what part of speech it will be used as in the exercise. This information also appears on all subsequent clue and bonus word screens. The first screen for each target word, under the heading "Derivation", also supplies a "history" or "background" for the word that may include some or all of the following points; but never the definition of target word:

language(s) from which word is derived;

the prefix used and its original meaning;

the root used and its original meaning;

a story connected to the origin of target word;

a particular problem or ambiguity associated with target word, such as a colloquial meaning different from or extending beyond the core meaning of the word;

The background provided to the student by the Derivation screen is critically important to learning and retaining the desired broad-based appreciation of the target word's proper definition and its proper use. This information is so important that, in the particular GUI shown in FIGS. 4–13, each Clue screen has a button that enables the student to review the Derivation screen for the target word from any subsequent Clue screen, by simply pointing to the "Derivation" tab located on the right side of the screen with the input device and clicking on it. Alternatively, the derivation might be reprised by pressing a given "hot key" on the keyboard. In this way, the GUI further assists and empowers the student, by providing the student a reminder of the Derivation screen's information if the student requests it. To prepare the student, this tab is even shown on the "Derivation" screen. After reading the Derivation screen the student advances the program at will to a clue screen by actuating a GUI button image alternately labeled "OK" or "Clue #1" or "NEXT" or pressing a key identified in the program's user instructions.

The screen labeled "Clue 1" presents a question or sentence to be completed,. This clue is directly related to the information given by the Derivation screen, but the target word does not appear in this first clue. Five possible responses are listed on the screen. An Answer screen automatically appears after each response to a clue by the student. An Answer screen either repeats the student's answer and asks the student to try again, or displays the correct answer and explains it, so that the student is provided additional information, perhaps more information than the student knew when selecting the correct answer.

If the student's first response is correct, two credits are awarded on the subsequent "Clue 1" Answer screen, which displays and explains the correct answer. If the first response was incorrect, the student is prompted to "Try Again" by a "Clue 1" Answer screen. If the second response is correct, the student is awarded one credit and the program automatically goes to the "Clue 1" Answer screen that displays and explains the correct answer. If the second response is not the correct answer, the student receives no credit, but the program still automatically advances to the Answer screen that displays and explains the correct answer. This is escape from repeated failure is particularly important if the student is having difficulty acclimating to inductive reasoning tasks.

Clue #1 requires student to make a direct connection to the information introduced by the Derivation screen without a direct reference to the target word, thereby initiating the inductive learning process. The answer and explanation for each subsequent clue adjust and modify that initial direct connection that Clue #1 made to the Derivation screen information by introducing new information for the student to link to the contents of the Derivation screen.

Clue #2 supplies a question or a sentence to be completed, but requires the student to combine prior common knowledge with the information seen on the Derivation screen. The target word does not appear on the Clue #2 screen, but it also supplies five possible answers. If the student's first response to the Clue #2 screen is correct, two credits are awarded, which again appear on the Answer screen, which shows and explains the correct answer as was done for Clue #1. If the first response was not correct the Clue #2 screen prompts the student to "Try Again." If the second response is correct, one credit is automatically displayed on the Answer screen along with the correct answer and its explanation. If the second response is incorrect, the student receives no credit, but the Answer screen shows the correct answer and its explanation, as it did after the Clue #1 screen. After reading the explanation of Clue #2 the student again advances the program to the Clue #3 screen using a GUI button, etc.

The Clue #3 screen shows a sentence containing the target word. Using the sentence as a context for that word, the student is requested to select an appropriate synonym for target word from five possible answers shown on the Clue #3 screen. If the student's first choice is correct, two credits are awarded, and the program automatically moves to the Answer screen, which repeats and explains the correct answer as in the other two clues. If the first choice was not correct, the student is prompted to "Try Again." and if the second choice is correct, one credit is awarded and the Answer screen automatically repeats the correct answer and shows the corresponding explanation. If the second choice was incorrect, the student receives no credit, and the program automatically goes to the Answer screen for the correct answer and its explanation.

In Clue #3 for the first time the student sees the target word in a context that suggests its definition, the answer and its explanation helps to further modify the students appraisal of its actual meaning, before advancing the program to the next clue.

The screen then provides Clue #4, which is an analogy question that presents the target word, linked to one of two words and a blank. The student must complete the analogy by choosing a word for the blank that continues the relationship established by the two linked words in the analogy, as is often found on standardized tests. The student is again presented five possible answers. If the student's first response is correct, two credits are awarded and the program automatically moves on to the Answer screen, showing the correct answer and its explanation, as with the other clues. If the first response was not correct, the Clue #4 screen prompts the student to "Try Again." If the second response is correct, one credit is awarded and the program again automatically goes to an Answer screen showing the correct answer and explanation. If the second response was incorrect, the student receives no credit, and the program automatically goes to the Answer screen, as before.

Clue #4 asks the student to recognize an intellectual relationship between words that connects the meaning of the target word with the meaning of the other word. The correct answer and explanation is direct information about the target word. This is done to modify the student's store of information provided up to this point, directly affecting the student's current working definition of the target word.

After the fourth clue is explained, the student advances the program to the last clue, Clue #5. Clue #5 is a sentence containing the target word, a blank and five possible answers for completing the sentence. The sentence, however, must be completed with a word that carries forward the logic of its text. Thus this is a check of the student's understanding of the exercise provided by Clue #4.

If the student's first response to Clue #5 is correct, two credits are again rewarded, and the program automatically presents the Answer screen, repeating the correct answer and providing its explanation, again giving the student additional information about the word. If the first response was not correct, the student is prompted to "Try Again." If the second response is correct, one credit is awarded and the program automatically advances to the Answer screen displaying the correct answer and its corresponding explanation. If the second response was incorrect, the student receives no credit, just a look at the Answer screen showing the correct answer and its explanation, as before. By the end of Clue #5, the student should have arrived inductively at a working definition of the target word.

Finally, the student advances to a screen which contains the formal Definition of the target word. After checking the working understanding formed thus far of the formal definition, the student advances the program to the final screens in the sequence for this target word, the Bonus screens. The Bonus screens ask the student to select a synonym for a bonus word that is closely related to the target word and lists five possible choices. If the student's first response to the bonus words shown is correct, two extra points are awarded to the student for each such immediately correct response and the program displays the correct answer. If the first response to the bonus word was not correct, a second attempt is permitted, after which the program automatically displays the correct answer and the student gets no points whether or not the student's response was correct. In either case, no explanation of correct answers is provided during bonus-word exercises.

The intense "bonus" exercises provide an opportunity for students to apply the knowledge they have gained immediately, which helps the students retention of the word learned, embedding the target word more solidly in the student's working vocabulary, but avoid repeating the more time-consuming response pattern used for the clues during the acquisition phase of the inductive learning task.

The invention has been described with particular reference to presently preferred embodiments thereof. However, it will be apparent to one skilled in the art that modifications and variations are possible within the spirit and scope of the present invention. The invention is defined by the claims.

EXHIBIT A•Sample Words

Category: Mythical & Historical Allusions Level: One Word: sophisticated Phonetic: seh-fiss'-tih-kay-ted Use: adjective Derivation: Sophisticated originally comes to us from the Greek word sophos, which means "skilled; clever," and from sophizesthai, which means "to play subtle tricks." Greek philosophers and teachers, called Sophists, were known for their use of devious arguments and reasoning. Today, sophisticated has lost much of its negative connotation and is generally regarded as a good quality.

Clue #1: What word would best describe a "devious argument?"
    straight
    pure
    simple
    complex
    radical Answer (Clue #1): complex Explanation (Clue #1): The purpose of a devious argument is to make it so difficult to follow that the opponent becomes confused.

Clue #2: What key ingredient would help you debate a topic successfully?
    emotion
    control
    dialogue
    knowledge
    humor Answer (Clue #2): knowledge Explanation (Clue #2): When debating, you must know your subject very well, and be highly prepared to argue against the opposing viewpoint.

Clue #5: Complete the following sentence:
    It isn't travel that makes one sophisticated, but it is the _____ one encounters while traveling that produce personal confidence and social ease.
    money
    tickets
    schedules
    experiences
    passports Answer (Clue #5): experiences Explanation (Clue #5): Being able to adjust to new people, foods, and life styles helps us to behave in a more civilized manner.

Now you know that sophisticated means "having acquired worldly knowledge or refinement; lacking natural simplicity."

Bonus: Based on your knowledge of this word, do you have enough clues to uncover the meaning of the following related word?
    subtle
    intelligent
    crafty
    noisy
    outrageous
    vacant Answer (Bonus): crafty Category: Roots & Prefixes Level: One Word: assign Phonetic: uh-sine'Use: verb Derivation: The first part of assign is the prefix a, which is the shortened Latin form of ad ("to, toward"). The root comes from the Latin word signare, meaning "to mark; to indicate." From experience, you know that signs provide all kinds of useful information. Let's see what connections you can make with this word.

Clue #1: When a person puts his or her name or mark at the end of a letter, it is called a _____.
    business
    resume
    finish
    synonym
    signature Answer (Clue #1): signature Explanation (Clue #1): We all put our special sign, which is our name, at the end of a letter.

Clue #2: Which of the following words describes what happens when you take away your name?
    design
    renew
    recite
    resign
    review Answer (Clue #2): resign Explanation (Clue #2): Notice that resign is pronounced reh-zine' (not "ree'-sign") and it means that you have removed your name or approval from a project or position.

Clue #3: Read the following sentence:
    Everyone in our class has been assigned a book report for next week.
    In this sentence, assigned most nearly means:
    appointed
    offered
    taught
    preferred
    released Answer (Clue #3): appointed Explanation (Clue #3): You have to present the book report. The teacher did not offer you a choice of whether or not you wanted to give it.

Clue #4: Complete the following analogy:
    give: gift:: assign:_____
    army
    task
    moon
    leg
    note Answer (Clue #4): task Explanation (Clue #4): A gift is the present someone gives to you, just as a task is the responsibility that has been assigned to you.

Clue #5: Complete the following sentence:
    I have to wash the car because the job has been assigned to _____.
    me
    you him
her
them
Answer (Clue #5): me
Explanation (Clue #5): The phrase "have to" makes it clear that no one but you is supposed to wash the car.
Now you know that assign means "to set apart for a specific purpose; to require the performance of some task."
Bonus: Based on your knowledge of this word, do you have enough clues to uncover the meanings of the following related words?
 design
  think
  create
  flower
  clever
  teach
Answer (Bonus 1): create
 significant
  meaningful
  meaningless
  memory
  reward
  appropriate
Answer (Bonus 2): meaningful
Category: Foreign Words Used in English Level: One Word: axis Phonetic: ak'-sis Use: noun
Derivation: Axis is taken directly from Latin, where it means "axle, hub." This word is used in math, botany, anatomy, physics, the fine arts, and history, and all of its many meanings depend upon its physical location. Notice how the literal meaning of axis is expanded by the context of a sentence.
Clue #1: Where is the hub of a wheel located?
 center
 edge
 side
 rim
 outside
Answer (Clue #1): center
Explanation (Clue #1): In fact, you put hubcaps over the hub to protect it from road dirt and moisture.
Clue #2: Any line that moves around an a center point will produce what symmetrical figure?
 square
 triangle
 plane
 circle
 hexagon
Answer (Clue #2): circle
Explanation (Clue #2): Watch a wheel turn and you realize that the hub is the center point and the rim makes a circle.
Clue #3: Read the following sentence:
 In much of his work, Grant used the horizon as an axis to provide structure for his photographs.
 In this sentence, axis most nearly means:
 color
 negative
 film
 routine
 focus
Answer (Clue #3): focus
Explanation (Clue #3): The photographer could put the horizon wherever he wanted and then connect all other objects to it, depending on the design he had in mind.

Clue #4: Complete the following analogy:
 axis: hub :: axle:_____
 engine
 shaft
 wheel
 light
 power
Answer (Clue #4): shaft
Explanation (Clue #4): Axis and hub are synonyms. Since a shaft is a long straight pole, it is a synonym of axle.
Clue #5: Complete the following sentence:
 Despite his advanced age, Grampa Will was still a dominating figure and the axis of our family, sitting quietly in the kitchen as constant activity _____ around him.
 revolved
 concluded
 hesitated
 departed
 listened
Answer (Clue #5): revolved
Explanation (Clue #5): Grampa Will is the central figure here, and the rest of the family swirls around him in their daily living.
Now you know that axis means "a line about which a body rotates, a center line to which other parts may be referred for measurement."
Bonus: Based on your knowledge of this word, do you have enough clues to uncover the meaning of the following related word?
 rotate
  despair
  approve
  include
  turn
  remove
Answer (Bonus): turn
Category: Strange & Unusual Words Level: Three Word: desultory Phonetic: dess'-ehl-tor-ee Use: adjective
Derivation: The Latin word circus means "circle," and for the Romans the Circus was a favorite pastime. One act consisted of horses trotting around the ring, while acrobats did tricks and jumped from the back of one horse to another. These performers were called desultors, from the prefix de ("down") and the root salire, meaning "to jump."
Clue #1: What was the purpose of all this jumping and running?
 advancement
 retreat
 rest
 entertainment
 confusion
Answer (Clue #1): entertainment
Explanation (Clue #1): The horses and acrobats weren't really going anywhere so all the activity was for the benefit of the spectators.
Clue #2: Which of the following words describes a trip where you take the car and just drive around with no particular destination in mind?
 direct
 demanding
 destructive
 aimless
 organized
Answer (Clue #2): aimless
Explanation (Clue #2): If there is no goal or destination, your travels could go in any direction for any length of time.

Clue #3: Read the following sentence:

Norman's economic life consisted of a series of desultory jobs which never lasted long and certainly never provided much income.

In this sentence, desultory most nearly means:
difficult
random
exciting
discrete
connected Answer (Clue #3): random Explanation (Clue #3): Norman has evidently not chosen a particular profession or field of work. He just takes whatever job is available.

Clue #4: Complete the following analogy:

wander: desultory :: march:_____
impatient
loose
preach
reinforce
determined

Answer (Clue #4): determined

Explanation (Clue #4): The verb wander implies lack of direction, and desultory describes such movement. Likewise, marched suggests a determined effort to reach a specific goal or purpose.

Clue #5: Complete the following sentence:

During the summer when I'm on vacation, my choice of books is rather desultory because it is based entirely on _____.

whim
domination
fear
concern
stress

Answer (Clue #5): whim

Explanation (Clue #5): Summer and vacation mean that you can read any kind of book you desire.

Now you know that desultory means "jumping from one thing to another; random; disconnected."

Bonus: Based on your knowledge of this word, do you have enough clues to uncover the meaning of the following related word?

descend
raise
lower
modify
approve
nullify

Answer (Bonus): lower

Category: Words Commonly Confused Level: Three Word: credulous Phonetic: krej'-yoo-luss Use: adjective Derivation: There are many words in English that are based on the Latin verb credere, which means "to believe." In particular credulous is worth studying because it is so often confused with another credere word, credible. Even though they both have exactly the same root, they have very different meanings. Still it seems quite clear that their definitions must be connected in some way. Can you determine the connection and the differences?

Clue #1: Which of the following words describes a person who believes everything she hears?

naïve
curious
thoughtful
aimless
useless

Answer (Clue #1): naive

Explanation (Clue #1): One who is naïve does not have the experience to analyze the validity of a statement, and so generally accepts every statement as true.

Clue #2: Here's the possible confusion. If you were a lawyer in an important case, whom would you present as a witness the jury was most likely to believe?

expert
judge
friend
defendant
victim

Answer (Clue #2): expert

Explanation (Clue #2): An expert witness has the knowledge and training to inspire the confidence necessary for a judge and jury to believe him. Can you see the connection with credere?

Clue #3: Read the following sentence:

We enjoyed telling fantastic stories to Harry because he was so credulous that he ran around school repeating them to anyone who would listen.

In this sentence, credulous most nearly means:
gullible
honest
quiet
wise
mysterious Answer (Clue #3): gullible Explanation (Clue #3): Now you can begin to see how the credere root is used in credulous.

Clue #4: Complete the following analogy:

doubtful: credulous :: professional:_____
truth
news
skillful
reporter
amateur

Answer (Clue #4): amateur

Explanation (Clue #4): A doubtful person is not willing to believe everything she hears, and so is the opposite of credulous. Likewise, an amateur is the opposite of a professional.

Clue #5: Complete the following sentence:

Only the most credulous person would mistake rumor for the _____.
result
time
conclusion
slander
truth Answer (Clue #5): truth Explanation (Clue #5): By definition, a rumor is a statement without facts to support it. Information becomes truth when proof is available.

Now you know that credulous means "disposed to believe too readily; gullible."

Bonus: Based on your knowledge of this word, do you have enough clues to uncover the meaning of the following related word?

credible
unusual
concrete comprehensive
trustworthy
dismal

Answer (Bonus): trustworthy

EXHIBIT B•Sample Phenomenon

Category: Physical Chemistry Level: One Word: sublimation Phonetic: suh'-bli-may-shun Use: noun Derivation: Sublimation originally comes to us from the Latin root limen and the Latin prefix sub together meaning "up to the doorway lintel" which gives wings to the heavenly adjective "sublime". This is a term that came into the English language through alchemists' medieval Latin texts. In contrast, the term "subliminal" as in "subliminal advertising" coined in the twentieth century by taking the Latin root limen, in the sense of "threshold", and the Latin prefix sub, in the sense of "under" to translate a German phrase meaning "below the threshold of consciousness".

Freudian psychologists have applied the term "subliminal" to a redirection of energies of the unconscious mind. These energies, which are usually seen in the form of biological drives, seem to disappear in individuals who become totally absorbed in some altruistic or aesthetic pursuit that offers no direct, or at least no discernible satisfaction of those biological drives. Their behavior, instead, appears to be paradoxical: If biological drives are expressions of our true nature, how can such people act without regard to those drives.

Clue #1: What word would best describe a "paradoxical" statement straight
    pure
    simple
    self-contradictory
    radical Answer (Clue #1): self contradictory Explanation (Clue #1): A statement that is paradoxical appears to state one premise but provide evidence to the contrary of a result that might be inferred from the premise. For example; Water begins to freeze as it cools, but warm water freezes faster than cold water. This is a true paradox, that is, it is true and it is a paradox.

Clue #2: Which one of the following does not significantly affect the rate at which water becomes ice on a city street?

temperature
    mechanical pressure
    dissolved or included gasses
    ambient humidity
    dissolved or included solids Answer (Clue #2): ambient humidity Explanation (Clue #2): Dissolved solids may include salt, and warm water tends to freeze faster than cold water in a range near 32° F. because it holds more air than the slightly cooler water can. Finally, just stepping on the slush left by melting ice can cause solid ice to reform. How much water is in the air affects how long how much water stays on the ground. It does not directly affect how soon the water on the ground turns solid.

Clue #5: Complete the following sentence:

Sublimate of mercury is a _____ produced from mercury vapor.
    liquid
    compound
    powder
    gas mixture
    colloid Answer (Clue #5): powder Explanation (Clue #5): When liquid mercury is heated so that it becomes a vapor, and then cooled sufficiently rapidly, the mercury does not collect in pools again. Instead, it appears to pass directly from the gas into a very finely-divided powder.

Now you know that sublimation is process in which a material is converted from a solid or liquid state into a finely-divided solid by heating the material until it rises as a vapor and then rapidly cooling the vapor.

Bonus: Based on your present knowledge of the physical chemistry of changes of state, do you have enough clues to uncover the meaning of the following related word?

regelation
        government interference
        titration
        solidification
        evaporation
        control Answer (Bonus): solidification

What is claimed is:

1. A method of guiding a student's acquisition of additional terminology for use in the student's vocabulary through the use of structured inductive reasoning, said method comprising the steps of:

displaying information indicating the derivation of a current target word to be added to the student's vocabulary;

displaying a clue that relates to the information indicating the derivation of the current target word and does not use the current target word, said clue offering answers for selection by the student;

displaying a clue that relates to and does use the current target word, said clue offering answers for selection by the student;

displaying the student's selected answer and asking the student to try again, if the answer selected by the student for a given clue was incorrect;

displaying the correct answer to the clue and an explanation of that answer, if the answer selected by the student for a given clue was correct; and displaying the correct answer to the clue and an explanation of that answer after a given number of incorrect answers have been selected by the student for a given clue.

2. The method of claim 1 wherein each clue offers the student the same predetermined number of answers.

3. The method of claim 1, said method further comprising the step of:

displaying a definition of the current target word implicitly indicated by the derivation display and the clue displays, after the correct answers to all the clues for the current target word have been displayed.

4. The method of claim 1, said method further comprising the steps of:

displaying the current target word, its pronunciation and part of speech, as a part of each clue displayed, and providing the student access to a display of the derivation information as a part of each clue displayed.

5. The method of claim 1, said method further comprising the step of:

displaying a summary of all clues and their correct answers, after the answers to all the clues to the current target word have been displayed.

6. The method of claim 1, said method further comprising the step of:

displaying a bonus clue requiring the student to use some part of the information previously displayed for the current target word, said clue offering answers for selection by the student, said bonus clue being displayed after a definition of the current target word and the answers to all the clues to the current target word have been displayed; and displaying the correct answer to the bonus clue without an explanation of that correct answer, if the answer selected by the student for the bonus clue was correct.

7. The method of claim 6 wherein said predetermined number of answers is offered for said bonus clue.

8. The method of claim 1, said method further comprising the step of:

displaying a rating of the student's efficiency in selecting the correct answers to clues for the current target word, after the answers to all the clues to the current target word have been displayed, said rating being standardized so that the rating is comparable to ratings attained by the student for other target words.

9. The method of claim 8, said method further comprising the step of:

displaying a total number of points earned so far for the current target word with each clue displayed for the current target word.

10. The method of claim 8 wherein a choice of quitting or continuing is offered to the student as part of said rating display, said method further comprising the steps of:

displaying a score card for all target words completed by the student out of a series of words having the same level and category as the current target word, said score card including cumulative performance data for said words, if the student chooses to quit; and providing the student an opportunity to select a new series of words or to review the current series of words or to quit as part of the score card display.

11. Computer apparatus including a display device, an input device for entering selections, an application program installed in the computer apparatus, and a processing unit for executing said application program, said application program being adapted to guide a student's acquisition of additional terminology for use in the student's vocabulary through the use of structured inductive reasoning, said application program comprising:

means for displaying information indicating the derivation of a current target word to be added to the student's vocabulary;

means for displaying a clue that relates to the information indicating the derivation of the current target word and does not use the current target word, said clue answers for selection by the student;

means for displaying a clue that relates to and does use the current target word, said clue offering answers for selection by the student;

means for displaying the student's selected answer to a clue and asking the student to try again if the answer selected by the student for the clue was incorrect;

means for displaying the correct answer to a clue and an explanation of that answer if the answer selected by the student for the clue was correct; and means for displaying the correct answer to a clue and an explanation of that answer after a given number of incorrect answers have been selected by the student for the clue.

12. The computer of claim 11 wherein said clues offer the same predetermined number of answers for selection by the student.

13. The computer of claim 11 further comprising:

means for displaying a definition of the current target word implicitly indicated by the derivation display and the clue displays, after the correct answers to all the clues for the current target word have been displayed.

14. The computer of claim 11 further comprising:

means for displaying the current target word, its pronunciation and part of speech, as a part of each clue displayed, and means for providing the student access to a display of the derivation information as a part of each clue displayed.

15. The computer of claim 11 further comprising:

means for displaying a summary of all clues and their correct answers, after the answers to all the clues to the current target word have been displayed.

16. The computer of claim 11 further comprising:

means for displaying a bonus clue requiring the student to use some part of the information previously displayed for the current target word, said clue offering answers for selection by the student, said bonus clue being displayed after a definition of the current target word and the answers to all the clues to the current target word have been displayed; and means for displaying the correct answer to the bonus clue without an explanation of that correct answer, if the answer selected by the student for the bonus clue was correct.

17. The computer of claim 16 wherein the bonus clue provides said predetermined number of answers.

18. The computer of claim 11 further comprising:

means for displaying a rating of the student's efficiency in selecting the correct answers to clues for the current target word, after the answers to all the clues to the current target word have been displayed, said rating being standardized so that the rating is comparable to ratings attained by the student for other target words.

19. The computer of claim 18 further comprising:

means for displaying a total number of points earned so far for the current target word with each clue displayed for the current target word.

20. The computer of claim 18 wherein a choice of quitting or continuing is offered to the student as part of said rating display, said computer further comprising:

means for displaying a score card for all target words completed by the student out of a series of words having the same level and category as the current target word, said score card including cumulative performance data for said words, if the student chooses to quit; and means for providing the student an opportunity to select a new series of words or to review the current series of words or to quit as part of the score card display.

21. A software program adapted for execution in a computer having a display device and having an input device for entering selections, said software program performing a method for guiding a student's acquisition of additional terminology for use in the student's vocabulary through structured inductive reasoning when executed in the computer, said method comprising the steps of:

displaying on the display device information indicating the derivation of a current target word to be added to the student's vocabulary;

displaying on the display device a clue that relates to the information indicating the derivation of the current target word and does not use the target current word, said clue offering answers for selection by the student using the input device;

displaying on the display device a clue that relates to and does use the current target word, said clue offering answers for selection by the student using the input device;

displaying on the display device the student's selected answer to a clue and a legend asking the student to try again if the answer selected by the student for the clue was incorrect;

displaying on the display device the correct answer to a clue and an explanation of that answer if the answer selected by the student for the clue was correct; and displaying on the display device the correct answer to a clue and an explanation of that answer after a given number of incorrect answers have been selected by the student for the clue.

22. The software program of claim 21 wherein each clue displayed offers a predetermined number of answers for selection by the student.

23. The software program of claim 21, said method further comprising the step of:

displaying a definition of the current target word implicitly indicated by the derivation display and the clue displays, after the correct answers to all the clues for the current target word have been displayed.

24. The software program of claim 21, said method further comprising the steps of:

displaying the current target word, its pronunciation and part of speech, as a part of each clue displayed, and providing the student access to a display of the derivation information as a part of each clue displayed.

25. The software program of claim 21, said method further comprising the step of:

displaying a summary of all clues and their correct answers, after the answers to all the clues to the current target word have been displayed.

26. The software program of claim 21, said method further comprising the steps of:

displaying a bonus clue requiring the student to use some part of the information previously displayed for the current target word, said bonus clue offering answers for selection by the student, said bonus clue being displayed after a definition of the current target word and the answers to all the clues to the current target word have been displayed; and displaying the correct answer to the bonus clue without an explanation of that correct answer, if the answer selected by the student for the bonus clue was correct.

27. The software program of claim 26 wherein said predetermined number of answers is provided for said bonus clue.

28. The software program of claim 21, said method further comprising the step of:

displaying a rating of the student's efficiency in selecting the correct answers to clues for the current target word, after the answers to all the clues to the current target word have been displayed, said rating being standardized so that the rating is comparable to ratings attained by the student for other target words.

29. The software program of claim 28, said method further comprising: the step of displaying a total number of points earned so far for the current target word with each clue displayed for the current target word.

30. The software program of claim 28 wherein a choice of quitting or continuing is offered to the student as part of said rating display, said method further comprising the steps of:

displaying a score card for all target words completed by the student out of a series of words having the same level and category as the current target word, said score card including cumulative performance data for said words, if the student chooses to quit; and providing the student an opportunity to select a new series of words or to review the current series of words or to quit as part of the score card display.

31. A software program adapted for execution in a computer including a display device and an input device for entering selections, said software program performing a method for guiding a student's acquisition of additional terminology for use in the student's vocabulary through structured inductive reasoning when executing in the computer, said method comprising the steps of:

displaying on the display device information indicating the derivation of a current target word to be added to the student's vocabulary;

displaying on the display device first and second clues that relate to the information indicating the derivation of the current target word and do not use the current target word, said clues offering a predetermined number of answers, respectively, for selection by the student using the input device;

displaying on the display device last and next to last clues that relate to and do use the current target word, said clues offering said predetermined number of answers, respectively, for selection by the student using the input device;

displaying on the display device the student's selected answer to a clue and a legend asking the student to try again if the answer selected by the student for the clue was incorrect;

displaying on the display device the correct answer to a clue and an explanation of that answer if the answer selected by the student for the clue was correct; and displaying on the display device the correct answer to a clue and an explanation of that answer after a given number of incorrect answers have been selected by the student for the clue.

32. The software program of claim 31 wherein a first clue directly references information in the derivation display, a second clue asks the student to combine common knowledge with information in the derivation display, a third clue uses the current target word in a sentence and asks the student for a synonym, a fourth clue is an analogy using the current target word, and a fifth clue is a sentence completion exercise showing a sentence using the current target word and including a blank space where a word is missing.

* * * * *